United States Patent [19]
Bourdelais et al.

[11] Patent Number: 6,048,606
[45] Date of Patent: Apr. 11, 2000

[54] DIGITAL TRANSMISSION DISPLAY MATERIALS WITH VOIDED POLYESTER

[75] Inventors: Robert P. Bourdelais, Pittsford; Alphonse D. Camp, Rochester; Thomas M. Laney; Peter T. Aylward, both of Hilton, all of N.Y.

[73] Assignee: Eastman Kodak Company, Rochester, N.Y.

[21] Appl. No.: 09/217,053

[22] Filed: Dec. 21, 1998

[51] Int. Cl.⁷ ..................................................... B32B 3/26
[52] U.S. Cl. .................................... 428/304.4; 428/318.6
[58] Field of Search ........................ 430/536; 428/318.6, 428/304.4

[56] References Cited

U.S. PATENT DOCUMENTS

| | | | |
|---|---|---|---|
| 4,701,369 | 10/1987 | Duncan | 428/313.9 |
| 4,701,370 | 10/1987 | Park | 428/304.4 |
| 5,084,334 | 1/1992 | Hamano et al. | 428/304.4 |
| 5,141,685 | 8/1992 | Maier et al. | 264/45.3 |
| 5,143,765 | 9/1992 | Maier et al. | 428/36.5 |
| 5,223,383 | 6/1993 | Maier et al. | 428/36.5 |
| 5,275,854 | 1/1994 | Maier et al. | 428/304.4 |
| 5,422,175 | 6/1995 | Ito et al. | 430/496 |
| 5,853,965 | 12/1998 | Haydock et al. | 430/22 |
| 5,866,282 | 2/1999 | Bourdelais et al. | 430/496 |
| 5,874,205 | 2/1999 | Bourdelais et al. | 430/496 |
| 5,902,720 | 5/1999 | Haydock et al. | 428/318.4 |

FOREIGN PATENT DOCUMENTS

| | | |
|---|---|---|
| 0 470 760 A2 | 2/1992 | European Pat. Off. . |
| 0 880 065 A1 | 11/1998 | European Pat. Off. . |
| 0 880 067 A1 | 11/1998 | European Pat. Off. . |
| 0 880 069 A1 | 11/1998 | European Pat. Off. . |
| 2 215 268 | 9/1989 | United Kingdom . |
| 2 325 749 | 12/1998 | United Kingdom . |
| 2 325 750 | 12/1998 | United Kingdom . |

OTHER PUBLICATIONS

Japanese Abstract 85/31669 w/claims.
Japanese Abstract 5,057,836, 1993.
Japanese Abstract 7,137,216, 1995 w/claim.

*Primary Examiner*—John Goodrow
*Attorney, Agent, or Firm*—Paul A. Leipold

[57] ABSTRACT

A imaging member comprising a polymer sheet comprising at least one layer of voided polyester polymer and at least one layer comprising nonvoided polyester polymer, wherein the imaging member has a percent transmission of between 40 and 60%, the imaging member further comprises tints, and the nonvoided layer is at least twice as thick as the voided layer.

22 Claims, No Drawings

DIGITAL TRANSMISSION DISPLAY MATERIALS WITH VOIDED POLYESTER

FIELD OF THE INVENTION

This invention relates to digital imaging materials. In a preferred form it relates to base materials for digital imaging transmission display.

BACKGROUND OF THE INVENTION

It is known in the art that photographic display materials are utilized for advertising, as well as decorative displays of photographic images. Since these display materials are used in advertising, the image quality of the display material is critical in expressing the quality message of the product or service being advertised. Further, a photographic display image needs to be high impact, as it attempts to draw consumer attention to the display material and the desired message being conveyed. Typical applications for display material include product and service advertising in public places such as airports, buses and sports stadiums, movie posters, and fine art photography. The desired attributes of a quality, high impact photographic display material are a slight blue density minimum, durability, sharpness, and flatness. Cost is also important, as display materials tend to be expensive compared with alternative display material technology, mainly lithographic images on paper. For display materials, traditional color paper is undesirable, as it suffers from a lack of durability for the handling, photoprocessing, and display of large format images. Further, traditional color paper is not optimum for transmission properties, as the spectral transmission of color paper is typically less than 10%.

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult requiring great care and expense to ensure proper laydown and cooling of the polyethylene layers. The formation of a suitably smooth surface would also improve image quality, as the display material would have more apparent blackness as the reflective properties of the improved base are more specular than the prior materials. As the whites are whiter and the blacks are blacker, there is more range in between and, therefore, contrast is enhanced. It would be desirable if a more reliable and improved surface could be formed at less expense.

Prior art photographic reflective papers comprise a melt extruded polyethylene layer which also serves as a carrier layer for optical brightener and other whitener materials, as well as tint materials. It would be desirable if the optical brightener, whitener materials, and tints, rather than being dispersed in a single melt extruded layer of polyethylene, could be concentrated nearer the surface where they would be more effective optically.

Prior art photographic transmission display materials with incorporated diffusers have light sensitive silver halide emulsions coated directly onto a gelatin coated clear polyester sheet. Incorporated diffusers are necessary to diffuse the light source used to backlight transmission display materials. Without a diffuser, the light source would reduce the quality of the image. Typically, white pigments are coated in the bottom most layer of the imaging layers. Since light sensitive silver halide emulsions tend to be yellow because of the gelatin used as a binder for photographic emulsions, minimum density areas of a developed image will tend to appear yellow. A yellow density minimum reduces the commercial value of a transmission display material because the image viewing public associates image quality with a neutral white. It would be desirable if a transmission display material with an incorporated diffuser could have a slight blue density minimum, since a density minimum that is slightly blue is perceptally preferred.

Prior art photographic transmission display materials with incorporated diffusers have light sensitive silver halide emulsions coated directly onto a gelatin subbed clear polyester sheet. $TiO_2$ is added to the bottom most layer of the imaging layers to diffuse light so well that individual elements of the illuminating bulbs utilized are not visible to the observer of the displayed image. However, coating $TiO_2$ in the imaging layer causes manufacturing problems such as increased coating coverage, which requires more coating machine drying capacity and a reduction in coating machine productivity as the $TiO_2$ requires additional cleaning of a coating machine. Further, as higher amounts of $TiO_2$ are used to diffuse high intensity backlighting systems, the $TiO_2$ coated in the bottom most imaging layer causes unacceptable light scattering, reducing the quality of the transmission image. It would be desirable to eliminate the $TiO_2$ from the image layers, while providing the necessary transmission properties and image quality properties.

Prior art photographic transmission display materials, while providing excellent image quality, tend to be expensive when compared with other quality imaging technologies such as ink jet imaging, thermal dye transfer imaging, and gravure printing. Since photographic transmission display materials require an additional imaging processing step compared to alternate quality imaging systems, the cost of a transmission photographic display can be higher than other quality imaging systems. The processing equipment investment required to process photographic transmission display materials also requires consumers to typically interface with a commercial processing lab increasing time to image. It would be desirable if a high quality transmission display support could utilize nonphotographic quality imaging technologies.

Photographic transmission display materials have considerable consumer appeal as they allow images to be printed on high quality support for home or small business use. Consumer use of photographic display materials generally have been cost prohibitive since consumers typically do not have the required volume to justify the use of such materials. It would be desirable if a high quality transmission display material could be used in the home without a significant investment in equipment to print the image.

PROBLEM TO BE SOLVED BY THE INVENTION

There is a need for transmission display materials that provide improved transmission of light while, at the same time, more efficiently diffusing in the light such that the elements of the light source are not apparent to the viewer.

SUMMARY OF THE INVENTION

It is an object of the invention to provide improved transmission display materials.

It is another object to provide display materials that are lower in cost, as well as providing sharp durable images.

It is a further object to provide more efficient use of the light used to illuminate transmission display materials.

It is another object to provide a transmission display that utilizes nonphotographic imaging technology.

These and other objects of the invention are accomplished by a imaging member comprising a polymer sheet comprising at least one layer of voided polyester polymer and at least one layer comprising nonvoided polyester polymer, wherein the imaging member has a percent transmission of between 40 and 60%, the imaging member further comprises tints, and the nonvoided layer is at least twice as thick as the voided layer.

ADVANTAGEOUS EFFECT OF THE INVENTION

The invention provides brighter images by allowing more efficient diffusion of light used to illuminate display materials.

DETAILED DESCRIPTION OF THE INVENTION

The invention has numerous advantages over prior transmission display materials and methods of imaging transmission display materials. The display materials of the invention provide very efficient diffusing of light, while allowing the transmission of a high percentage of the light. The materials are low in cost, as the transparent polymer material sheet is thinner than in prior products. The formation of transmission display materials requires a display material that diffuses light so well that individual elements of the illuminating bulbs utilized are not visible to the observer of the displayed image. On the other hand, it is necessary that light be transmitted efficiently to brightly illuminate the display image. The invention allows a greater amount of illuminating light to actually be utilized as display illumination, while at the same time very effectively diffusing the light sources such that they are not apparent to the observer. The imaging display material of the invention will appear whiter to the observer than prior art materials, which have a tendency to appear somewhat yellow as prior art materials require a high amount of light scattering pigments to prevent the viewing of individual light sources. These high concentrations of pigments appear yellow to the observer and result in an image that is darker than desirable. The transmission display support contains an integral imaging receiver adhesion layer with avoids the need for expensive primer coatings that are necessary when for example gelatin based ink jet receiving layers are coated on polyester.

Because nonphotographic imaging systems are used to image the support, the display materials are more assessable to the consumer as digital printing systems such as ink jet or thermal dye transfer are widely available and low in cost for small volume. Finally, since the imaging technology used in this invention does not require wet chemistry processing of images, the environmental problems associated with the use and disposal of processing chemicals are avoided. These and other advantages will be apparent from the detailed description below.

The term as used herein, "transparent", means the ability to pass radiation without significant deviation or absorption. For this invention, "transparent" material is defined as a material that has a spectral transmission greater than 90%. For a imaging element, spectral transmission is the ratio of the transmitted power to the incident power and is expressed as a percentage as follows: $T_{RGB}=10^{-D}*100$ where D is the average of the red, green, and blue Status A transmission density response measured by an X-Rite model 310 (or comparable) photographic transmission densitometer. The terms as used herein, "top", "upper", "image receiving layer side", and "face" mean the side or toward the side of the voided polyester. The terms, "bottom", "lower side", and "back" mean the side or toward the side of the transparent polyester. The term as used herein, "duplitized" element means imaging elements with a imaging receiving layer coated on both the top side and the bottom side of the imaging support.

The layers of the coextruded polyester sheet of this invention have levels of voiding, optical brightener, and colorants adjusted to provide optimum transmission properties. The polyester sheet has a voided layer to efficiently diffuse the illuminating light source common with transmission display materials without the use of expensive $TiO_2$ or other white pigments. The coextruded polyester base of the invention contains a clear polyester layer to provide stiffness to the imaging support material of the invention without corrupting the transmission of light. The thickness ratio between the voided layer and the clear layer is at least 1:2. Below a 1:2 ratio, the support would not allow sufficient illumination for a quality image, as the voided layer would be too thick to allow for illumination of the image.

The polyester sheet of this invention preferably has a coextruded integral imaging receiving adhesion layer. Beyond the transparent layer and the voided layer, a coextruded polyethylene layer can be used with corona discharge treatment as a ink jet adhesion layer, avoiding the need for a primer coating common with polyester sheets. A polyethylene layer with corona discharge treatment is preferred because gelatin based ink jet receiving layers adhere well to polyethylene without the need for primer coatings. An additional example of an integral imaging receiving adhesion layer is a thin layer of biaxially oriented polycarbonate allows a solvent based polycarbonate dye receiver layer typical of thermal dye transfer imaging to adhere to the base without an expensive primer coating.

Further, the integral polyethylene skin layer may also contain blue tints and optical brightener to compensate for the native yellowness of the gelatin based ink jet receiving layer. The voided, oriented polyester sheet of this invention is also low in cost, as the functional layer is coextruded at the same time, avoiding the need for further processing such as lamination, priming, or extrusion coating.

An important aspect of this invention is the imaging support can be coated with a imaging receiving layer on the top side and the bottom side of the imaging support. This duplitized coating is preferred when a high density transmission image is necessary. The duplitized imaging receiving layer coating combined with the optical properties of the oriented polyester sheet provides an improved transmission display material that can be used in high quality transmission images. A backside primer coating is necessary when a coating gelatin based image receiving layers on the backside because gelatin does not adhere well to polyester.

The polyester utilized in the invention should have a glass transition temperature between about 50° C. and about 150° C., preferably about 60–100° C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexane-dicarboxylic, sodiosulfoiso-phthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

Suitable cross-linked polymers for the microbeads used in void formation during sheet formation are polymerizable organic materials which are members selected from the group consisting of an alkenyl aromatic compound having the general formula

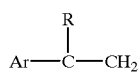

wherein Ar represents an aromatic hydrocarbon radical, or an aromatic halohydrocarbon radical of the benzene series and R is hydrogen or the methyl radical; acrylate-type monomers including monomers of the formula

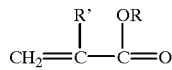

wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula

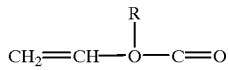

wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$, wherein n is a whole number within the range 2–10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, oiallyl fumarate, diallyl phthalate, and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arrylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield nonuniformly sized particles, characterized by broad particle size distributions. The resulting beads can be classified by screening to produce beads spanning the range of the original distribution of sizes. Other processes such as suspension polymerization and limited coalescence directly yield very uniformly sized particles. Suitable slip agents or lubricants include colloidal silica, colloidal alumina, and metal oxides such as tin oxide and aluminum oxide. The preferred slip agents are colloidal silica and alumina, most preferably, silica. The cross-linked polymer having a coating of slip agent may be prepared by procedures well known in the art. For example, conventional suspension polymerization processes wherein the slip agent is added to the suspension is preferred. As the slip agent, colloidal silica is preferred.

It is preferred to use the "limited coalescence" technique for producing the coated, cross-linked polymer microbeads. This process is described in detail in U.S. Pat. No. 3,615,972. Preparation of the coated microbeads for use in the present invention does not utilize a blowing agent as described in this patent, however.

The following general procedure may be utilized in a limited coalescence technique:

1. The polymerizable liquid is dispersed within an aqueous nonsolvent liquid medium to form a dispersion of droplets having sizes not larger than the size desired for the polymer globules, whereupon
2. The dispersion is allowed to rest and to reside with only mild or no agitation for a time during which a limited coalescence of the dispersed droplets takes place with the formation of a lesser number of larger droplets, such coalescence being limited due to the composition of the suspending medium, the size of the dispersed droplets thereby becoming remarkably uniform and of a desired magnitude, and
3. The uniform droplet dispersion is then stabilized by addition of thickening agents to the aqueous suspending medium, whereby the uniform-sized dispersed droplets are further protected against coalescence and are also retarded from concentrating in the dispersion due to difference in density of the disperse phase and continuous phase, and
4. The polymerizable liquid or oil phase in such stabilized dispersion is subjected to polymerization conditions and polymerized, whereby globules of polymer are obtained having spheroidal shape and remarkably uniform and desired size, which size is predetermined principally by the composition of the initial aqueous liquid suspending medium.

The diameter of the droplets of polymerizable liquid, and hence the diameter of the beads of polymer, can be varied predictably, by deliberate variation of the composition of the aqueous liquid dispersion, within the range of from about one-half of a $\mu$m or less to about 0.5 centimeter. For any specific operation, the range of diameters of the droplets of liquid, and hence of polymer beads, has a factor in the order of three or less as contrasted to factors of 10 or more for diameters of droplets and beads prepared by usual suspension polymerization methods employing critical agitation procedures. Since the bead size, e.g., diameter, in the present method is determined principally by the composition of the aqueous dispersion, the mechanical conditions, such as the degree of agitation, the size and design of the apparatus used, and the scale of operation, are not highly critical. Furthermore, by employing the same composition, the operations can be repeated, or the scale of operations can be changed, and substantially the same results can be obtained.

The present method is carried out by dispersing one part by volume of a polymerizable liquid into at least 0.5, preferably from 0.5 to about 10 or more, parts by volume of a nonsolvent aqueous medium comprising water and at least the first of the following ingredients:

1. A water-dispersible, water-insoluble solid colloid, the particles of which, in aqueous dispersion, have dimensions in the order of from about 0.008 to about 50 vm, which particles tend to gather at the liquid-liquid interface or are caused to do so by the presence of
2. A water-soluble "promoter" that affects the "hydrophilic-hydrophobic balance" of the solid colloid particles; and/or
3. An electrolyte; and/or
4. Colloid-active modifiers such as peptizing agents, surface-active agents and the like; and usually,
5. A water-soluble, monomer-insoluble inhibitor of polymerization.

The water-dispersible, water-insoluble solid colloids can be inorganic materials such as metal salts or hydroxides or clays, or can be organic materials such as raw starches, sulfonated cross-linked organic high polymers, resinous polymers, and the like.

The solid colloidal material must be insoluble but dispersible in water and both insoluble and nondispersible in, but wettable by, the polymerizable liquid. The solid colloids must be much more hydrophilic than oleophilic so as to remain dispersed wholly within the aqueous liquid. The solid colloids employed for limited coalescence are ones having particles that, in the aqueous liquid, retain a relatively rigid and discrete shape and size within the limits stated. The particles may be greatly swollen and extensively hydrated, provided that the swollen particle retains a definite shape, in which case the effective size is approximately that of the swollen particle. The particles can be essentially single molecules, as in the case of extremely high molecular weight cross-linked resins, or can be aggregates of many molecules. Materials that disperse in water to form true or colloidal solutions in which the particles have a size below the range stated or in which the particles are so diffuse as to lack a discernible shape and dimension are not suitable as stabilizers for limited coalescence. The amount of solid colloid that is employed is usually such as corresponds to from about 0.01 to about 10 or more grams per 100 cubic centimeters of the polymerizable liquid.

In order to function as a stabilizer for the limited coalescence of the polymerizable liquid droplets, it is essential that the solid colloid must tend to collect with the aqueous liquid at the liquid-liquid interface, i.e., on the surface of the oil droplets. (The term "oil" is occasionally used herein as generic to liquids that are insoluble in water.) In many instances, it is desirable to add a "promoter" material to the aqueous composition to drive the particles of the solid colloid to the liquid-liquid interface. This phenomenon is well known in the emulsion art, and is here applied to solid colloidal particles, as an expanded of adjusting the "hydrophilic-hydrophobic balance."

Usually, the promoters are organic materials that have an affinity for the solid colloid and also for the oil droplets and that are capable of making the solid colloid more oleophilic. The affinity for the oil surface is usually due to some organic portion of the promoter molecule, while affinity for the solid colloid is usually due to opposite electrical charges. For example, positively charged complex metal salts or hydroxides, such as aluminum hydroxide, can be promoted by the presence of negatively charged organic promoters such as water-soluble sulfonated polystyrenes, alignates, and carboxymethylcellulose. Negatively charged colloids, such as Bentonite, are promoted by positively charged promoters such as tetramethyl ammonium hydroxide or chloride or water-soluble complex resinous amine condensation products, such as the water-soluble condensation products of diethanolamine and adipic acid, the water-soluble condensation products of ethylene oxide, urea and formaldehyde, and polyethylenimine. Amphoteric materials such as proteinaceous materials like gelatin, glue, casein, albumin, glutin and the like are effective promoters for a wide variety of colloidal solids. Nonionic materials like methoxycellulose are also effective in some instances. Usually, the promoter need be used only to the extent of a few parts per million of aqueous medium, although larger proportions can often be tolerated. In some instances, ionic materials normally classed as emulsifiers, such as soaps, long chain sulfates and sulfonates and the long chain quaternary ammonium compounds, can also be used as promoters for the solid colloids, but care must be taken to avoid causing the formation of stable colloidal emulsions of the polymerizable liquid and the aqueous liquid medium.

An effect similar to that of organic promoters is often obtained with small amounts of electrolytes, e.g., water-soluble, ionizable alkalies, acids and salts, particularly those having polyvalent ions. These are especially useful when the excessive hydrophilic or insufficient oleophilic characteristic of the colloid is attributable to excessive hydration of the colloid structure. For example, a suitably cross-linked sulfonated polymer of styrene is tremendously swollen and hydrated in water. Although the molecular structure contains benzene rings which should confer on the colloid some affinity for the oil phase in the dispersion, the great degree of hydration causes the colloidal particles to be enveloped in a cloud of associated water. The addition of a soluble, ionizable polyvalent cationic compound, such as an aluminum or calcium salt, to the aqueous composition causes extensive shrinking of the swollen colloid with exudation of a part of the associated water and exposure of the organic portion of the colloid particle, thereby making the colloid more oleophilic.

The solid colloidal particles whose hydrophilic-hydrophobic balance is such that the particles tend to gather in the aqueous phase at the oil-water interface, gather on the surface of the oil droplets and function as protective agents during limited coalescence.

Other agents that can be employed in an already known manner to effect modification of the colloidal properties of the aqueous composition are those materials known in the art as peptizing agents, flocculating and deflocculating agents, sensitizers, surface active agents, and the like.

It is sometimes desirable to add to the aqueous liquid a few parts per million of a water-soluble, oil-insoluble inhibitor of polymerization effective to prevent the polymerization of monomer molecules that might diffuse into the aqueous liquid or that might be absorbed by colloid micelles and that, if allowed to polymerize in the aqueous phase, would tend to make emulsion-type polymer dispersions instead of, or in addition to, the desired bead or pearl polymers.

The aqueous medium containing the water-dispersible solid colloid is then admixed with the liquid polymerizable material in such a way as to disperse the liquid polymerizable material as small droplets within the aqueous medium. This dispersion can be accomplished by any usual means, e.g., by mechanical stirrers or shakers, by pumping through jets, by impingement, or by other procedures causing subdivision of the polymerizable material into droplets in a continuous aqueous medium.

The degree of dispersion, e.g., by agitation is not critical except that the size of the dispersed liquid droplets must be no larger, and is preferably much smaller, than the stable droplet size expected and desired in the stable dispersion. When such condition has been attained, the resulting dispersion is allowed to rest with only mild, gentle movement, if any, and preferably without agitation. Under such quiescent conditions, the dispersed liquid phase undergoes a limited degree of coalescence.

"Limited coalescence" is a phenomenon wherein droplets of liquid dispersed in certain aqueous suspending media coalesce, with formation of a lesser number of larger droplets, until the growing droplets reach a certain critical and limiting size, whereupon coalescence substantially ceases. The resulting droplets of dispersed liquid, which can be as large as 0.3 and sometimes 0.5 centimeter in diameter, are quite stable as regards further coalescence and are remarkably uniform in size. If such a large droplet dispersion be vigorously agitated, the droplets are fragmented into smaller droplets. The fragmented droplets, upon quiescent standing, again coalesce to the same limited degree and form the same uniform-sized, large droplet, stable dispersion. Thus, a dispersion resulting from the limited coalescence comprises droplets of substantially uniform diameter that are stable in respect to further coalescence.

The principles underlying this phenomenon have now been adapted to cause the occurrence of limited coalescence in a deliberate and predictable manner in the preparation of dispersions of polymerizable liquids in the form of droplets of uniform and desired size.

In the phenomenon of limited coalescence, the small particles of solid colloid tend to collect with the aqueous liquid at the liquid-liquid interface, i.e., on the surface of the oil droplets. It is thought that droplets which are substantially covered by such solid colloid are stable to coalescence while droplets which are not so covered are not stable. In a given dispersion of a polymerizable liquid the total surface area of the droplets is a function of the total volume of the liquid and the diameter of the droplets. Similarly, the total surface area barely coverable by the solid colloid, e.g., in a layer one particle thick, is a function of the amount of the colloid and the dimensions of the particles thereof. In the dispersion as initially prepared, e.g., by agitation, the total surface area of the polymerizable liquid droplets is greater than can be covered by the solid colloid. Under quiescent conditions, the unstable droplets begin to coalesce. The coalescence results in a decrease in the number of oil droplets and a decrease in the total surface area thereof up to a point at which the amount of colloidal solid is barely sufficient substantially to cover the total surface of the oil droplets, whereupon coalescence substantially ceases.

If the solid colloidal particles do not have nearly identical dimensions, the average effective dimension can be estimated by statistical methods. For example, the average effective diameter of spherical particles can be computed as the square root of the average of the squares of the actual diameters of the particles in a representative sample.

It is usually beneficial to treat the uniform droplet suspension prepared as described above to render the suspension stable against congregation of the oil droplets.

This further stabilization is accomplished by gently admixing with the uniform droplet dispersion an agent capable of greatly increasing the viscosity of the aqueous liquid. For this purpose, there may be used any water-soluble or water-dispersible thickening agent that is insoluble in the oil droplets and that does not remove the layer of solid colloidal particles covering the surface of the oil droplets at the oil-water interface. Examples of suitable thickening agents are sulfonated polystyrene (water-dispersible, thickening grade), hydrophilic clays such as Bentonite, digested starch, natural gums, carboxy-substituted cellulose ethers, and the like. Often the thickening agent is selected and employed in such quantities as to form a thixotropic gel in which are suspended the uniform-sized droplets of the oil. In other words, the thickened liquid generally should be non-Newtonian in its fluid behavior, i.e., of such a nature as to prevent rapid movement of the dispersed droplets within the aqueous liquid by the action of gravitational force due to the difference in density of the phases. The stress exerted on the surrounding medium by a suspended droplet is not sufficient to cause rapid movement of the droplet within such non-Newtonian media. Usually, the thickener agents are employed in such proportions relative to the aqueous liquid that the apparent viscosity of the thickened aqueous liquid is in the order of at least 500 centipoises (usually determined by means of a Brookfield viscosimeter using the No. 2 spindle at 30 r.p.m.). The thickening agent is preferably prepared as a separate concentrated aqueous composition that is then carefully blended with the oil droplet dispersion.

The resulting thickened dispersion is capable of being handled, e.g., passed through pipes, and can be subjected to polymerization conditions substantially without mechanical change in the size or shape of the dispersed oil droplets.

The resulting dispersions are particularly well suited for use in continuous polymerization procedures that can be carried out in coils, tubes, and elongated vessels adapted for continuously introducing the thickened dispersions into one end and for continuously withdrawing the mass of polymer beads from the other end. The polymerization step is also practiced in batch manner.

The order of the addition of the constituents to the polymerization usually is not critical, but beneficially it is more convenient to add to a vessel the water, dispersing agent, and incorporated the oil-soluble catalyst to the monomer mixture, and subsequently add with agitation the monomer phase to the water phase.

The following is an example illustrating a procedure for preparing the cross-linked polymeric microbeads coated with slip agent. In this example, the polymer is polystyrene cross-linked with divinylbenzene. The microbeads have a coating of silica. The microbeads are prepared by a procedure in which monomer droplets containing an initiator are sized and heated to give solid polymer spheres of the same size as the monomer droplets. A water phase is prepared by combining 7 liters of distilled water, 1.5 g potassium dichromate (polymerization inhibitor for the aqueous phase), 250 g polymethylaminoethanol adipate (promoter), and 350 g LUDOX (a colloidal suspension containing 50% silica sold by DuPont). A monomer phase is prepared by combining 3317 g styrene, 1421 g divinylbenzene (55% active cross-linking agent; other 45% is ethyl vinyl benzene which forms part of the styrene polymer chain) and 45 g VAZO 52 (a monomer-soluble initiator sold by DuPont). The mixture is passed through a homogenizer to obtain 5 $\mu$m droplets. The suspension is heated overnight at 52° C. to give 4.3 kg of generally spherical microbeads having an average diameter of about 5 $\mu$m with narrow size distribution (about 2–10 $\mu$m size distribution). The mol proportion of styrene and ethyl vinyl benzene to divinylbenzene is about 6.1%. The concentration of divinylbenzene can be adjusted up or down to result in about 2.5–50% (preferably 10–40%) cross-linking by the active cross-linker. Of course, monomers other than styrene and divinylbenzene can be used in similar suspension polymerization processes known in the art. Also, other initiators and promoters may be used as known in the art. Also, slip agents other than silica may also be used. For example, a number of LUDOX colloidal silicas are available from DuPont. LEPANDIN colloidal alumina is available from Degussa. NALCOAG colloidal silicas are available from Nalco, and tin oxide and titanium oxide are also available from Nalco.

Normally, for the polymer to have suitable physical properties such as resiliency, the polymer is cross-linked. In the case of styrene cross-linked with divinylbenzene, the polymer is 2.5–50% cross-linked, preferably 20–40% cross-linked. By percent cross-linked, it is meant the mol % of cross-linking agent based on the amount of primary monomer. Such limited cross-linking produces microbeads which are sufficiently coherent to remain intact during orientation of the continuous polymer. Beads of such cross-linking are also resilient, so that when they are deformed (flattened) during orientation by pressure from the matrix polymer on opposite sides of the microbeads, they subsequently resume their normal spherical shape to produce the largest possible voids around the microbeads to thereby produce articles with less density.

The microbeads are referred to herein as having a coating of a "slip agent". By this term it is meant that the friction at the surface of the microbeads is greatly reduced. Actually, it is believed this is caused by the silica acting as miniature ball bearings at the surface. Slip agent may be formed on the surface of the microbeads during their formation by including it in the suspension polymerization mix.

Microbead size is regulated by the ratio of silica to monomer. For example, the following ratios produce the indicated size microbead:

| Microbead Size, $\mu$m | Monomer, Parts by Wt. | Slip Agent (Silica) Parts by Wt. |
|---|---|---|
| 2 | 10.4 | 1 |
| 5 | 27.0 | 1 |
| 20 | 42.4 | 1 |

The microbeads of cross-linked polymer range in size from 0.1–50 $\mu$m, and are present in an amount of 5–50% by weight based on the weight of the polyester. Microbeads of polystyrene should have a Tg of at least 20° C. higher than the Tg of the continuous matrix polymer and are hard compared to the continuous matrix polymer.

Elasticity and resiliency of the microbeads generally result in increased voiding, and it is preferred to have the Tg of the microbeads as high above that of the matrix polymer as possible to avoid deformation during orientation. It is not believed that there is a practical advantage to cross-linking above the point of resiliency and elasticity of the microbeads.

The microbeads of cross-linked polymer are at least partially bordered by voids. The void space in the supports should occupy 2–60%, preferably 30–50%, by volume of the film support. Depending on the manner in which the supports are made, the voids may completely encircle the microbeads, e.g., a void may be in the shape of a doughnut (or flattened doughnut) encircling a micro-bead, or the voids may only partially border the microbeads, e.g., a pair of voids may border a microbead on opposite sides.

During stretching the voids assume characteristic shapes from the balanced biaxial orientation of paperlike films to the uniaxial orientation of microvoided/satinlike fibers. Balanced microvoids are largely circular in the plane of orientation, while fiber microvoids are elongated in the direction of the fiber axis. The size of the microvoids and the ultimate physical properties depend upon the degree and balance of the orientation, temperature and rate of stretching, crystallization kinetics, the size distribution of the microbeads, and the like.

The film supports according to this invention are prepared by:

(a) forming a mixture of molten continuous matrixpolymer and cross-linked polymer wherein the cross-linked polymer is a multiplicity of microbeads uniformly dispersed throughout the matrix polymer, the matrix polymer being as described hereinbefore, the cross-linked polymer microbeads being as described hereinbefore, (b) forming a film support from the mixture by extrusion or casting, (c) orienting the article by stretching to form microbeads of cross-linked polymer uniformly distributed throughout the article and voids at least partially bordering the microbeads on sides thereof in the direction, or directions of orientation.

The mixture may be formed by forming a melt of the matrix polymer and mixing therein the cross-linked polymer. The cross-linked polymer may be in the form of solid or semisolid microbeads. Due to the incompatibility between the matrix polymer and cross-linked polymer, there is no attraction or adhesion between them, and they become uniformly dispersed in the matrix polymer upon mixing.

When the microbeads have become uniformly dispersed in the matrix polymer, a film support is formed by processes such as extrusion or casting. Examples of extrusion or casting would be extruding or casting a film or sheet. Such forming methods are well known in the art. If sheets or film material are cast or extruded, it is important that such article be oriented by stretching, at least in one direction. Methods of unilaterally or bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process. Two examples are high-speed melt spinning of fibers and melt blowing of fibers and films to form nonwoven/spun-bonded products. In summary, the scope of this invention includes the complete range of forming operations just described.

In general, void formation occurs independent of, and does not require, crystalline orientation of the matrix polymer. Opaque, microvoided films have been made in accordance with the methods of this invention using completely amorphous, noncrystallizing copolyesters as the matrix phase. Crystallizable/orientable (strain hardening) matrix materials are preferred for some properties like tensile strength and gas transmission barrier. On the other hand, amorphous matrix materials have special utility in other areas like tear resistance and heat sealability. The specific matrix composition can be tailored to meet many product needs. The complete range from crystalline to amorphous matrix polymer is part of the invention.

The preferred spectral transmission of the polyester base of this invention is at least 40%. Spectral transmission is the amount of light energy that is transmitted through a material. For a imaging element, spectral transmission is the ratio of the transmitted power to the incident power and is expressed as a percentage as follows: $T_{RGB}=10^{-D}*100$ where D is the average of the red, green, and blue Status A transmission density response measured by an X-Rite model 310 (or comparable) photographic transmission densitometer. The higher the transmission, the less opaque the material. For a transmission display material with an incorporated diffuser, the quality of the image is related to the amount of light reflected from the image to the observers eye. A transmission display image with a low amount of spectral transmission does not allow sufficient illumination of the image causing a perceptual loss in image quality. A transmission image with a spectral transmission of less than 35% is unacceptable for a transmission display material, as the quality of the image cannot match prior art transmission display materials. Further, spectral transmissions less than 35% will require additional dye density which increases the cost of the transmission display material. A transmission image with a spectral transmission greater than 70% begins to allow the filaments of the illumination light source to show through to the image significantly reducing the quality of the image.

The most preferred spectral transmission density for the polyester base of this invention is between 46% and 54%. This range allows for optimization of transmission and optical properties to create a display material that diffuses the illuminating light source and minimizes dye density of the image receiving layers.

The imaging member of the invention has a preferred thickness of between 76 μm and 256 μm. Below 70 μm, the base does not have sufficient stiffness to allow for efficient transport of the image, as the invention must be transported through digital printers such as ink jet and thermal printers. Above 270 μm, there is not sufficient justification for the additional expense for additional polymer materials. Orientation of the polyester base is preferred, as an oriented polymer is stiffer and stronger than a nonoriented polymer, thus the required imaging member stiffness can be obtained with the use of less material compared to a nonoriented polyester. The preferred thickness of the voided layer of polyester is between 6 and 50 μm. Below 5 μm, the voided layer thickness is not sufficient to provide diffusion of the illuminating light source. Above 60 μm, the % transmission is less than 40%, not allowing enough transmitted light to properly illuminate the image causing a loss in image quality.

The surface roughness of the topside determines the transmission characteristics of the image. Surface roughness for the topside and the bottom side are measured by TAYLOR-HOBSON Surtronic 3 with 2 μm diameter ball tip. The output Ra or "roughness average" from the TAYLOR-HOBSON is in units of μm and has a built-in, cutoff filter to reject all sizes above 0.25 mm. For the top surface, a surface roughness of between 0.02 and 0.25 μm is preferred because this roughness range creates a glossy surface that has commercial value, as most transmission display materials are glossy in nature.

For some markets, a matte surface on the transmission display material is desirable. Prior art transmission display materials require post processing treatment of the image with a separate coating to create a matte surface. Surface roughness for the transmission display materials of the invention is integral with the coextruded support using known techniques for creating a rough surface. Example of surface roughness techniques include the addition of addenda such as silica or calcium carbonate to the surface layer and embossing the surface after the sheet has been oriented. For a matte surface appearance, a surface roughness of between 0.30 and 2.00 μm is preferred. A surface roughness less than 0.25 is considered glossy. A surface roughness greater than 2.25 caused the image receiving layer to puddle and create an undesirable discontinuous surface. Further, a surface roughness greater than 2.25 μm has been shown to emboss the image receiving layers when the transmission display material is wound in a roll.

The coextruded polyester base of the invention preferably contains a nonvoided layer that is at least twice as thick as the voided layer. The voided to nonvoided ratio must be at least 1:2 because a voided to nonvoided ratio less than 1:2 would yield a voided layer that is greater than 25 μm which would reduce the % transmission below 40%. The preferred structure for the invention is a nonvoided layer to add stiffness to the imaging member and a thin layer of voided polyester to diffuse the illuminating light source.

Addenda may be added to any coextruded layer in the polymer sheet to change the color of the imaging element. For transmission display use, a white base with a slight bluish tinge is preferred. Further, the native yellowness of the gelatin based imaging receiving layers must be corrected with blue tints because a yellow density minimum area is unsatisfactory. The addition of the slight bluish tinge may be accomplished by any process which is known in the art including the machine blending of color concentrate prior to extrusion and the melt extrusion of blue colorants that have been preblended at the desired blend ratio. Colored pigments that can resist extrusion temperatures greater than 320° C. are preferred, as temperatures greater than 320° C. are necessary for coextrusion of the polymer layers. Blue colorants used in this invention may be any colorant that does not have an adverse impact on the imaging element. Preferred blue colorants include Phthalocyanine blue pigments, Cromophtal blue pigments, Irgazin blue pigments, Irgalite organic blue pigments, and pigment blue 60.

Addenda may be added to the polymer sheet of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed outside, as sunlight contains ultraviolet energy and may be used to optimize image quality for consumer and commercial applications.

Addenda known in the art to emit visible light in the blue spectrum are preferred. Consumers generally prefer a slight blue tint to a minimum density area of an image defined as a negative b* compared to a neutral density minimum defined as a b* within one b* unit of zero. b* is the measure of yellow/blue in CIE space. A positive b* indicates yellow, while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is an illuminated ultraviolet light source and a light source without any significant ultraviolet energy. Delta b* is the preferred measure to determine the net effect of adding an optical brightener to the top biaxially oriented sheet of this invention. Emissions less than 1 b* unit cannot be noticed by most customers; therefore, is it not cost effective to add optical brightener to the polymer layers because it will not make a perceptual difference. An emission greater that 5 b* units would interfere with the color balance of the prints making the whites appear too blue for most consumers.

The surface roughness of the polymer sheet of this invention or Ra is a measure of relatively finely spaced surface irregularities such as those produced on the backside of imaging materials by the casting of polyethylene against a rough chilled roll. The surface roughness measurement is a measure of the maximum allowable roughness height expressed in units of gm and by use of the symbol Ra.

Oriented polyester sheets commonly used in the imaging industry are commonly melt extruded and then oriented in both directions (machine direction and cross direction) to give the sheet desired mechanical strength properties. The process of biaxially orientation generally creates a surface roughness of less than 0.23 $\mu$m. While the smooth surface has value in the imaging industry for use as a glossy surface, a smooth surface on the backside can cause conveyance problems during transport in digital imaging equipment. For efficient web conveyance through digital imaging equipment, a surface roughness greater than 0.30 $\mu$m is preferred to ensure efficient transport through the many types of digital imaging equipment that have been purchased and installed around the world. At surface roughness less that 0.30 $\mu$m, transport through digital imaging equipment becomes less efficient. At surface roughness greater than 2.54 $\mu$m, the surface would become too rough causing transport problems in digital imaging equipment.

In order to successfully transport display materials of the invention, the reduction of static caused by web transport through printing equipment is desirable. The polymer materials of this invention have a marked tendency to accumulate static charge as they contact machine components during transport. The use of an antistatic material to reduce the accumulated charge on the web materials of this invention is desirable. Antistatic materials may be coated on the web materials of this invention and may contain any known materials known in the art which can be coated on imaging web materials to reduce static during the transport of imaging paper. Examples of antistatic coatings include conductive salts and colloidal silica. Desirable antistatic properties of the support materials of this invention may also be accomplished by antistatic additives which are an integral part of the polymer layer. Incorporation of additives that migrate to the surface of the polymer to improve electrical conductivity include fatty quaternary ammonium compounds, fatty amines, and phosphate esters. Other types of antistatic additives are hydroscopic compounds such as polyethylene glycols and hydrophobic slip additives that reduce the coefficient of friction of the web materials. An antistatic coating applied to the opposite side of the image layer or incorporated into the backside polymer layer is preferred. The backside is preferred because the majority of the web contact during conveyance in manufacturing and digital printing is on the backside. The preferred surface resistivity of the antistat coat at 50% RH is less than $10^{11}$ ohm/square. A surface resistivity of the antistat coat at 50% RH is less than $10^{11}$ ohm/square has been shown to sufficiently reduce static.

The polyester film will typically contain an undercoat or primer layer on both sides of the polyester film. Subbing layers used to promote adhesion of coating compositions to the support are well known in the art and any such material can be employed. Some useful compositions for this purpose include interpolymers of vinylidene chloride such as vinylidene chloride/methyl acrylate/itaconic acid terpolymers or vinylidene chloride/acrylonitrile/acrylic acid terpolymers, and the like. These and other suitable compositions are described, for example, in U.S. Pat. Nos. 2,627,088; 2,698,240; 2,943,937; 3,143,421; 3,201,249; 3,271,178; 3,443,950; and 3,501,301. The polymeric subbing layer is usually overcoated with a second subbing layer comprised of gelatin, typically referred to as gel sub. The preferred primer coating is a layer comprised of gelatin because gelatin based image receiving layers adhere well to polyester.

The structure of a preferred oriented, voided polyester imaging base where the image receiving layer is coated on the voided polyester layer is as follows:

Voided polyester with blue tint and optical brightener
Transparent polyester

As used herein, the phrase "imaging element" is a material that utilizes nonphotograpahic technology in the formation of images. The imaging elements can be black-and-white, single color elements, or multicolor elements. Nonphotograpahic imaging methods include thermal dye transfer, ink jet, electrophotographic, electrographic, flexographic printing, or rotogravure printing. The imaging layers are preferably applied to the top of the imaging support.

The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount which is effective for the intended purpose. In general, good results have been obtained at a concentration of from about 1 to about 10 g/m$^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228.

As noted above, dye-donor elements are used to form a dye transfer image. Such a process comprises image-wise-heating a dye-donor element and transferring a dye image to a dye-receiving element as described above to form the dye transfer image.

In a preferred embodiment of the thermal dye transfer method of printing, a dye donor element is employed which comprises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in detail in many books and publications. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photorecptors.

In one form of the electrophotographic process copiers use imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, a photosensitive element is permanently imaged to form areas of differential conductivity. Uniform electrostatic charging, followed by differential discharge of the imaged element, creates an electrostatic image. These elements are called electrographic or xeroprinting masters because they can be repeatedly charged and developed after a single imaging exposure.

In an alternate electrographic process, electrostatic images are created iono-graphically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

The dye receiving layer or DRL for ink jet imaging may be applied by any known methods, such as solvent coating, or melt extrusion coating techniques. The DRL is coated over the tie layer (TL) at a thickness ranging from 0.1–10 μm, preferably 0.5–5 μm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al. in U.S. Pat. Nos. 4,879,166; 5,264,275; 5,104,730; 4,879,166; and Japanese patents 1,095,091; 2,276,671; 2,276,670; 4,267,180; 5,024,335; and 5,016,517, discloses aqueous based DRL formulations comprising mixtures of psuedo-bohemite and certain water soluble resins. Light, in U.S. Pat. Nos. 4,903,040; 4,930,041; 5,084,338; 5,126,194; 5,126,195; and 5,147,717 discloses aqueous-based DRL formulations comprising mixtures of vinyl pyrrolidone polymers and certain water-dispersible and/or water-soluble polyesters, along with other polymers and addenda. Butters et al. in U.S. Pat. Nos. 4,857,386 and 5,102,717, disclose ink-absorbent resin layers comprising mixtures of vinyl pyrrolidone polymers and acrylic or methacrylic polymers. Sato et al. in U.S. Pat. No. 5,194,317 and Higuma, et al. in U.S. Pat. No. 5,059,983 disclose aqueous-coatable DRL formulations based on poly (vinyl alcohol). Iqbal, in U.S. Pat. No. 5,208,092 discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is a 0.1–10 μm DRL which is coated as an aqueous dispersion of 5 parts alumoxane and 5 parts poly (vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Printing generally accomplished by Flexographic or Rotogravure. Flexography is an offset letterpress technique where the printing plates are made from rubber or photopolymers. The printing is accomplished by the transfer of the ink from the raised surface of the printing plate to the support of this invention. The Rotogravure method of printing uses a print cylinder with thousands of tiny cells which are below the surface of the printing cylinder. The ink is transferred from the cells when the print cylinder is brought into contact with the web at the impression roll.

Suitable inks for this invention include solvent based inks, water based inks, and radiation cured inks. Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of water based inks include acrylic emulsion, maleic resin dispersion, styrene maleic anhydride resins, and other synthetic polymers. Examples of radiation cured inks include ultraviolet and electron beam cure inks.

When the support of this invention is printed with Flexographic or Rotogravure inks, a ink adhesion coating may be required to allow for efficient printing of the support. The top layer of the biaxially oriented sheet may be coated with any materials known in the art to improve ink adhesion to biaxially oriented polyolefin sheets of this invention. Examples include acrylic coatings and polyvinyl alcohol coatings. Surface treatments to the biaxially oriented sheets of this invention may also be used to improve ink adhesion. Examples include corona and flame treatment.

For the display material of this invention, at least one image receiving layer located on the top side or bottom side of said imaging element is preferred. Applying the imaging receiving layer to either the top or bottom is preferred for a quality transmission display material. For some markets improved image quality requires an increase in dye density. For the display material of this invention it is preferred that at least one image layer comprising an imaging receiving layer is located on both the top and bottom of the imaging support of this invention. Applying an image layer to both the top and bottom of the support allows for optimization of image density.

The following examples illustrate the practice of this invention. They are not intended to be exhaustive of all possible variations of the invention. Parts and percentages are by weight unless otherwise indicated.

EXAMPLES

Example 1

In this example a coextruded voided, oriented polyester base material was coated with a typical gelatin based ink jet receiving layer. The polyester base had blue tint and optical brightener added to the voided polyester layer to correct for the native yellowness of the gelatin based ink jet receiving layer utilized. The invention also contained a skin of low density polyethylene for adequate imaging layer adhesion. This example will show that the image formed on the polyester base of this invention was an acceptable transmission display image as measured by several image quality parameters critical for transmission display images. Further, several advantages resulting from utilizing nonphotographic imaging methods will be obvious.

The following is the layer structure and materials for the voided polyester base:

Top Layer:
A layer of low density polyethylene with a layer thickness of 1.0 μm.

Middle Layer:
A layer of mircovoided polyester (polyethylene terephthalate) comprising polyester and microbeads with a layer thickness of 25 μm and a percent voiding of 50%. The voiding agent was a cross-linked microbead of polystyrene with divinylbenzene in the amount of 50% by weight of said layer. The mean particle size of the microbead was between 1 to 2 μm and were coated with a slip agent of colloidal alumina. To this layer pigment blue 60 and Hostalux KS (Ciba-Geigy) optical brightener were added to offset the yellowness of the gelatin based image receiving layer. The 0.30% by weight of pigment blue 60 and 0.12% by weight of optical brightener was added to the voided polyester layer.

Bottom Layer:
The bottom layer of the coextruded support was a solid layer of polyester that was 100 μm thick. The polyester has an intrinsic viscosity of at about 0.68 cp.

The top, middle, and bottom layers were coextruded through a standard three slot coat hanger die at 265° C. onto a chill roll controlled at a temperature between 50–60° C. The three layer film was stretched biaxially using a standard laboratory film stretching unit at a temperature of 105° C.

The preparation steps for the cross-linked microbeads used to void the middle layer of the coextruded support were as follows:

(1) The microbeads were prepared by conventional aqueous suspension polymerization to give nearly monodisperse bead diameters from 2 to 20 μm and at levels of cross-linking from 5 mol % to 30 mol %.

(2) After separation and drying, the microbeads were compounded on conventional twin-screw extrusion equipment into the polyester at level of 25% by weight and pelletized to form a concentrate, suitable for letdown to lower loadings.

(3) The microbead concentrate pellets were mixed with virgin pellets and dried using standard conditions for polyethylene terephthalate, 170–180° C. convection with desiccated air for between 4–6 hours.

An ink jet image receiving layer was utilized to prepare the transmission display material of this example and was coated on the polyethylene skin layer on the display support. The ink jet image receiving layer was coated by means of an extrusion hopper with a dispersion containing 326.2 g of gelatin, 147 g of BVSME hardener, i.e., (bis (vinylsulfonylmethyl) ether 2% solution in water, 7.38 g of a dispersion containing 2.88 g of 11.5 μm polystyrene beads, 0.18 g of Dispex™ (40% solution in water obtained from Allied Colloids, Inc.), and 4.32 g of water, and 3.0 g of a 20% solution in water of Surfactant 10G (nonylphenoxypolyglycidol) obtained from Olin Matheson Company. The thickness was about 5 μm (dried thickness).

Onto this layer was coated by means of an extrusion hopper an aqueous solution containing 143.5 g of a 3% solution in water of 4.42 g of hydroxypropyl cellulose (Methocel KLV100, Dow Chemical Company), 0.075 g of vanadyl sulfate, 2-hydrate obtained from Eastman Kodak Company, 0.075 g of a 20% solution in water of Surfactant 10G (nonylphenoxypolyglycidol) obtained from Olin Matheson Company, and 145.4 g of water; and 0.45 g of a 20% solution in water of Surfactant 10G (nonylphenoxypolyglycidol) obtained from Olin Matheson Company and 79.5 g of water to form an ink-receiving layer about 2 μm in thickness (dry thickness).

The structure of the ink jet transmission display material of the example was the following:

Ink jet receiving layer
Polyethylene skin layer
Voided polyester with blue tint and optical brightener
Transparent polyester The display support was measured for status A density using an X-Rite Model 310 photographic densitometer. Spectral transmission is calculated from the Status A density readings and is the ratio of the transmitted power to the incident power and is expressed as a percentage as follows: $T_{RGB} = 10^{-D} * 100$ where D is the average of the red, green, and blue Status A transmission density response. The display material were also measured for L*, a*, and b* using a Spectrogard spectrophotometer, CIE system, using illuminant D6500. In transmission, a qualitative assessment was made as to the amount of illuminating backlighting show through. A substantial amount of show through would be considered undesirable as the nonfluorescent light sources used in this test could interfere with the image quality. The display material of this example was printed with various test images on a Hewlett Packard Desk Jet 870 Cxi ink jet printer. The data for invention is listed in Table 1 below.

TABLE 1

| Measure | Invention |
| --- | --- |
| % Transmission | 48% |
| CIE D6500 L* | 74.75 |
| CIE D6500 a* | −0.09 |
| CIE D6500 b* | −2.24 |
| Illuminating Backlight Showthrough | None |

The transmission display support coated on the top side with the ink jet ink receiving layer of this example exhibits all the properties needed for an transmission imaging display material. Further, the imaging transmission display material of this example has many advantages. The nonvoided layers have levels of $TiO_2$ and colorants adjusted to provide a white minimum density, as the invention was able to overcome the native yellowness that is common with gelatin based ink or dye receiving layers. The density minimum b* for the invention was −2.24 which yields a density minimum area that has a slight blue tint and perceptually preferred over a yellow density minimum. In the transmission mode, the illuminating backlights did not show through, indicating the invention was able to diffuse the illuminating backlight and allow enough light to be transmitted to provide a quality image.

The 48% transmission for the invention provides an acceptable transmission image as 48% transmission allows enough light through the support to illuminate the image. Further, concentration of the tint materials and the white pigments in the polyester sheet allows for improved manufacturing efficiency and low a material utilization resulting in a low cost transmission display material. The a* and L* for the invention are consistent with a high quality transmission display material. The invention would be low in cost as a 126 μm polyester base was used in the invention compared to a 200 μm polyester typical used for prior art display materials. Finally, because ink jet printing technology was utilized to form the images, the images was printed in 12 minutes compared to a typical time to image of several days for photographic transmission display materials.

The invention has been described in detail with particular reference to certain preferred embodiments thereof, but it will be understood that variations and modifications can be effected within the spirit and scope of the invention.

What is claimed is:

1. An imaging member comprising an image receiving layer and a base comprising a polymer sheet comprising at least one layer of voided polyester polymer and at least one layer comprising nonvoided polyester polymer, wherein the base of said imaging member has a percent light transmission of between 40 and 60%, the imaging member further comprises tints, the nonvoided layer is at least twice as thick as the voided layer, and said layer of voided polyester is between 6 and 50 μm thick.

2. The imaging member of claim 1 wherein said polymer sheet is oriented.

3. The imaging member of claim 1 wherein said polymer sheet comprises at least one polyethylene layer.

4. The imaging member of claim 1 wherein said member further comprises at least one subbing layer.

5. The imaging member of claim 1 wherein said void space comprises between about 2 and 60% by volume of said voided layer of said polymer sheet.

6. The imaging member of claim 2 wherein said imaging member has a thickness of between 76 and 256 μm.

7. The imaging member of claim 6 wherein said tints comprise bluing tints.

8. The imaging member of claim 1 wherein said polymer sheet comprises optical brighteners.

9. The imaging member of claim 7 wherein said polymer sheet is substantially free of inorganic pigments.

10. The imaging element of claim 1 wherein said element comprises at least one ink jet receiving layer.

11. The imaging element of claim 1 wherein said element comprises at least one thermal dye receiving layer.

12. The imaging member of claim 1 wherein said imaging member further comprises a bottom layer comprising an image receiving layer.

13. The imaging member of claim 1 wherein at least one layer below said polyethylene containing layer comprises a charge control agent having an electrical resistivity of less than $10^{11}$ log-ohms per square.

14. The imaging member of claim 1 wherein said voided layer contains organic particles that are the voiding initiating material for said voided layer.

15. The imaging member of claim 1 wherein the back of said imaging member has a surface roughness of between 0.3 and 2.0 μm.

16. The imaging member of claim 1 wherein the top of said imaging member has a matte surface with a surface roughness of between 0.3 and 2.0 μm.

17. The imaging member of claim 1 wherein the top of said imaging member has a glossy surface with a surface roughness between 0.02 and 0.25 μm.

18. The imaging member of claim 1 wherein said element comprises at least one electrophotographic receiving layer.

19. The imaging member of claim 1 wherein said element comprises at least one ink printing receiving layer.

20. The imaging member of claim 16 wherein said imaging member is greater than 76 μm thick.

21. The imaging member of claim 17 wherein said member is between 76 and 256 μm thick.

22. The imaging member of claim 21 wherein said tints comprise bluing tints and said polymer sheet as substantially free of inorganic pigments.

* * * * *